3,088,976
BIS(o-PHENYLENEDIAMINO)DIBORON
Robert J. Brotherton, Fullerton, and Lowell L. Petterson, Whittier, Calif., assignors to United States Borax & Chemical Corporation, Los Angeles, Calif., a corporation of Nevada
No Drawing. Filed Mar. 20, 1962, Ser. No. 181,148
3 Claims. (Cl. 260—551)

The present invention relates as indicated to bis(o-phenylenediamino)diboron and has further reference to a method for preparing the same.

It is, therefore, the principal object of the present invention to provide as a new composition bis(o-phenylenediamino)diboron.

It is a further object of this invention to provide a method for preparing bis(o-phenylenediamino)diboron.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises as a new composition of matter bis(o-phenylenediamino)diboron.

The present bis(o-phenylenediamino)diboron has utility as a reducing agent in chemical reactions. This compound also has utility as an epoxy resin curing agent, and is an active ingredient in the preparation of new herbicidal compositions.

The preparation of bis(o-phenylenediamino)diboron can best be illustrated by the following equation:

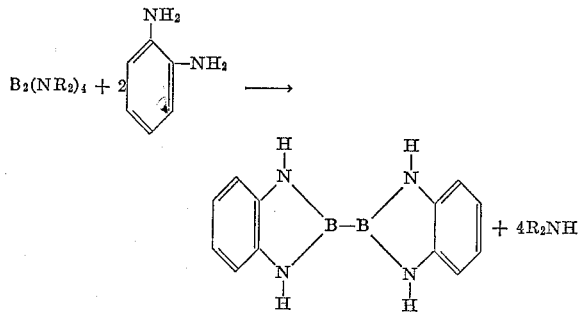

where R is either a primary or a secondary alkyl radical of from 1 to 6 carbon atoms.

The preferred method for performing the above reaction is to admix o-phenylenediamine and a tetra(dialkylamino)diboron compound in an inert solvent. The resultant admixture is then heated under reflux, and the secondary alkylamine reaction product is continuously removed from the reaction mass. After substantially all of the secondary alkylamine reaction product has been removed, the bis(o-phenylenediamino)diboron is recovered from the residual reaction mass by any of the well-known separation techniques, such as filtering, centrifuging, etc.

The present reaction will proceed regardless of the amount of each reactant present. If desired, the tetra-(dialkylamino)diboron reactant can be used in sufficient excess where it also can act as the solvent medium. In the preferred embodiment of the invention we use the o-phenylenediamine and the tetra(dialkylamino)diboron reactants in about a 2:1 molar ratio.

The tetra(dialkylamino)diboron compounds applicable, as reactants, to the present invention have the formula $B_2(NR_2)_4$, where R is either a primary or a secondary alkyl radical of from 1 to 6 carbon atoms. Reference to these compounds, and means for their preparation can be found in the Brotherton et al., Patent U.S. No. 2,974,165. The following list is illustrative of these compounds:

tetra(dimethylamino)diboron
tetra(diethylamino)diboron
tetra(di-n-propylamino)diboron
tetra(diisopropylamino)diboron
tetra(di-n-butylamino)diboron
tetra(diisobutylamino)diboron
tetra(di-n-amylamino)diboron
tetra(di-n-hexylamino)diboron The solvents applicable to the present invention must be inert to the present reactants, and have a boiling point greater than that of the secondary alkylamine reaction product. Most of the common commercially available hydrocarbon solvents and ethers are suitable for this purpose. The following list is illustrative of these compounds:

benzene
toluene
xylene
chlorobenzene
octane
decane
dodecane
diisopropylether
diethyleneglycol dimethyl ether
triethyleneglycol dimethyl ether It is to be clearly understood that the foregoing lists are only a partial enumeration of the compounds applicable to the present invention, and are not intended to limit the invention.

So that the present invention can be more clearly understood, the following examples are given for illustrative purposes:

I

Tetra(dimethylamino)diboron, 4.43 grams (22.38 mmoles) was added to a solution of 4.83 grams (44.65 mmoles) of o-phenylenediamine in 80 ml. of benzene in a 500 ml. round-bottomed flask equipped with a reflux condenser and a nitrogen inlet and attached to a trap containing a standard aqueous acid solution. Nitrogen was allowed to pass slowly over the admixture which was heated under reflux for about 37 hours at which time 84.8 mmoles (95% of theoretical) of dimethylamine had been swept into the acid solution. The residual reaction mass was then allowed to cool, and was filtered. The filter cake was dried and 5.03 grams (96.3% yield) of bis-(o-phenylenediamino)diboron, M.P. 375°–376° C., was recovered. Chemical analysis of the product yielded the following data:

Calculated for $C_{12}H_{12}B_2N_4$: C=61.62%; H=5.17%; N=23.96%; B=9.25%. Found in product: C=61.45%; H=5.33%; N=23.76%; B=9.31.%.

II

Tetra(dimethylamino)diboron, 4.43 grams (22.38 m.moles), twice the stoichiometric amount required for complete reaction, was added to a solution of 2.41 grams (22.30 mmoles) of o-phenylenediamine in 80 ml. of benzene, in a 500 ml. round-bottomed flask equipped with a reflux condenser and a nitrogen inlet and attached to a trap containing a standard aqueous acid solution. Nitrogen was allowed to pass slowly over the admixture which was heated under reflux for about 13 hours at which time 46.3 mmoles (104% of theoretical) of dimethylamine had been swept into the acid solution. The residual reaction mass was then allowed to cool, and was filtered, and the filtrate was subjected to distillation to yield 70% of the excess tetra(dimethylamino)diboron. The filter cake was dried, and 2.44 grams (92.4% yield) of bis(o-phenylenediamino)diboron, M.P. 376°–380° C., was recovered. Chemical analysis of the product yielded the following data:

Calculated for $C_{12}H_{12}B_2N_4$: C=61.62%; H=5.17%; N=23.96%; B=9.25%. Found in product: C=61.58%; H=5.29%; N=23.57%; B=9.63%.

III

Tetra(diisopropylamino)diboron, 10.36 grams (24.53 mmoles), was added to a solution of 5.31 grams (49.06 mmoles) of o-phenylenediamine in 120 ml. of toluene in a 500 ml. round-bottomed flask equipped with a reflux condenser and a nitrogen inlet and attached to a trap containing a standard aqueous acid solution. Nitrogen was allowed to pass slowly over the admixture which was heated under reflux for about 16 hours at which time 94.18 mmole (97% of theoretical) of diisopropylamine had been swept into the acid solution. The residual reaction mass was then allowed to cool, and was filtered. The filter cake was dried and 5.59 grams (97.4% yield) of bis(o-phenylenediamino)diboron, M.P. 375°–376° C., was recovered. Chemical analysis of the product yielded the following data:

Calculated for $C_{12}H_{12}B_2N_4$: C=61.62%; H=5.17%; N=23.96%; B=9.25%. Found in product: C=61.56%; H=5.27%; N=23.84%; B=9.29%.

Other modes of applying the principle of the invention may be employed, change being made as regards the details described, provided the features stated in any of the following claims or the equivalent of such be employed.

We, therefore, particularly point out and distinctly claim as our invention:

1. The method for preparing bis(o-phenylenediamino)-diboron which comprises admixing o-phenylenediamine and a tetra(dialkylamino)diboron having the formula $B_2(NR_2)_4$ where R is selected from the group consisting of primary and secondary alkyls of 1–6 carbon atoms, heating said admixture under reflux in the presence of a solvent inert to said reactants and solvent having a boiling point higher than that of the dialkylamine reaction product, continuously removing the dialkylamine and recovering the bis(o-phenylenediamino)diboron from the residual reaction mass.

2. The method for preparing bis(o-phenylenediamino)-diboron which comprises admixing o-phenylenediamine and tetra(dimethylamino)diboron, heating said admixture under reflux in the presence of a solvent inert to said reactants said solvent having a boiling point higher than dimethylamine, continuously removing dimethylamine from the reaction mass and recovering the bis(o-phenylenediamino)diboron from the residual reaction mass.

3. The method for preparing bis(o-phenylenediamino)-diboron which comprises admixing o-phenylenediamine and tetra(diisopropylamino)diboron, heating said admixture under reflux in the presence of a solvent inert to said reactants said solvent having a boiling point higher than diisopropylamine, continuously removing diisopropylamine from the reaction mass and recovering the bis-(o-phenylenediamino)diboron from the residual reaction mass.

References Cited in the file of this patent
UNITED STATES PATENTS
3,009,941    Brotherton et al. _____ Nov. 21, 1961